United States Patent [19]

Katoh

[11] Patent Number: 5,034,809
[45] Date of Patent: Jul. 23, 1991

[54] PERSONAL VIDEO VIEWING APPARATUS
[75] Inventor: Hideaki Katoh, Tokyo, Japan
[73] Assignee: Palca, Inc., Tokyo, Japan
[21] Appl. No.: 376,668
[22] Filed: Jul. 7, 1989
[30] Foreign Application Priority Data Apr. 21, 1989 [JP] Japan .................................. 1-102877

[51] Int. Cl.[5] ........................ H04N 13/00; H04N 5/74; H04N 5/72
[52] U.S. Cl. ..................................... 358/88; 358/250; 358/92; 358/236; 350/137; 350/143
[58] Field of Search .................. 358/88, 250, 236, 91, 358/92; 350/137, 143, 133, 130

[56] References Cited

U.S. PATENT DOCUMENTS

| | | | |
|---|---|---|---|
| 4,310,849 | 1/1982 | Glass | 358/250 |
| 4,636,866 | 11/1987 | Hattori | 358/250 |
| 4,805,988 | 2/1989 | Dones | 358/88 |
| 4,853,764 | 8/1989 | Sutter | 358/88 |

Primary Examiner—John K. Peng
Attorney, Agent, or Firm—Spencer & Frank

[57] ABSTRACT

A video display apparatus has a pair of displaying devices for displaying, by using television signals, images to be respectively viewed with left and right eyes; a pair of magnifying lenses for the left and right eyes; and a frame for supporting the displays and the magnifying lenses so that left and right virtual images formed by the magnifying lens, when images on the screens of the displays are viewed with the left and right eyes, coincide with each other. This video display apparatus enables stereoscopic vision by displaying video images on the displays on the basis of the principle of binocular parallax. half mirrors may be disposed between the magnifying lens and the eyes to enable images on the displays or the outside scenery to be selectively viewed. A shutter may also be provided between the half mirrors and the outside scenery to facilitate viewing of the displayed image.

8 Claims, 11 Drawing Sheets

PERSONAL VIDEO VIEWING APPARATUS

BACKGROUND OF THE INVENTION

This invention relates to a video display apparatus which is capable of magnifying the display on a video display terminal (VDT) operating with video signals and which enables stereoscopic vision of the displayed image.

Ordinarily, video display apparatus represented by home TV receivers are used in such a manner that a VDT having a single screen is placed on the floor or a table and the image on the screen is viewed at a distance.

Recently, lighter-weight and portable display apparatus such as a TV receiver having a liquid crystal display are becoming widely used. However, they are still based on the system of viewing one screen with two eyes.

This type of conventional video disk play apparatus has some drawbacks, which are described below.

① The viewer will experience fatigue if he watches images on a stationary video display apparatus for a long time because he must fix his eyes on the apparatus and must generally maintain the same posture during viewing. The limited number of variations of posture which the viewer can maintain while keeping his eyes fixed on the stationary video display apparatus are usually unnatural and not easy to hold.

② In the case of a portable video display apparatus, it is possible to reduce this type of burden by changing the position of the apparatus. However, the number of positions where the video display apparatus can be placed is limited. If the viewer wishes to watch the screen while lying on his back, he must support the apparatus with his arm, resulting in fatigue of the arm.

③ In general, portable video display apparatus have smaller screens because they need to be reduced in weight. It is therefore difficult to enjoy watching large and impressive images when using portable video display apparatus.

④ Ordinarily, the space between the video display apparatus and the viewer is shared by him or her and other persons in the room. There is therefore a possibility of disturbing these other persons. It is also difficult to maintain secrecy of displayed images.

SUMMARY OF THE INVENTION

In view of these problems, an object of the present invention is to provide a video display apparatus based on a totally new system which enables stereoscopic image display by virtue of its specific structural features.

To achieve this object, in accordance with the present invention, there is provided a video display apparatus having: left and right display devices for displaying images to be respectively seen with left and right eyes by using television signals; magnifying lenses for the left and right eyes; and a frame for supporting the display devices and the magnifying lenses so that left and right virtual images formed by the magnifying lens when images on the screens of the left and right display devices are viewed with the left and right eyes coincide with each other.

The viewer can watch images on the large screen by wearing the above-described apparatus put on in association with his two eyes. During this viewing, variations of the posture of the viewer are not restricted and the secrecy of the images can be effectively maintained.

The video display apparatus enables stereoscopic vision by displaying images on the left and right display devices by using left and right video signals formed on the basis of the principle of three-dimensional display relating to binocular parallax. The video display apparatus may be provided with at least one half mirror disposed between the magnifying lens and the eyes while the magnifying lenses and the display devices are disposed on the reflection side of the half mirror. The amounts of light transmitted through the display devices are changed or controlled in such a manner that images displayed on the display devices and the outside scenery seen through the half mirror can be viewed by being selected or by being simultaneously superposed on each other. A shutter may also be provided between the half mirror and the outside scenery in the direction of transmission through the half mirror. Even if the brightness on the outside is high as compared with the amount of light emitted from the display devices, it is possible to view the images displayed on the screens of the display devices alone by closing the shutter so as to shut off light transmitted through the half mirror.

DESCRIPTION OF THE PREFERRED EMBODIMENTS

The present invention will be described below in detail with reference to the accompanying drawings.

Figure 1:
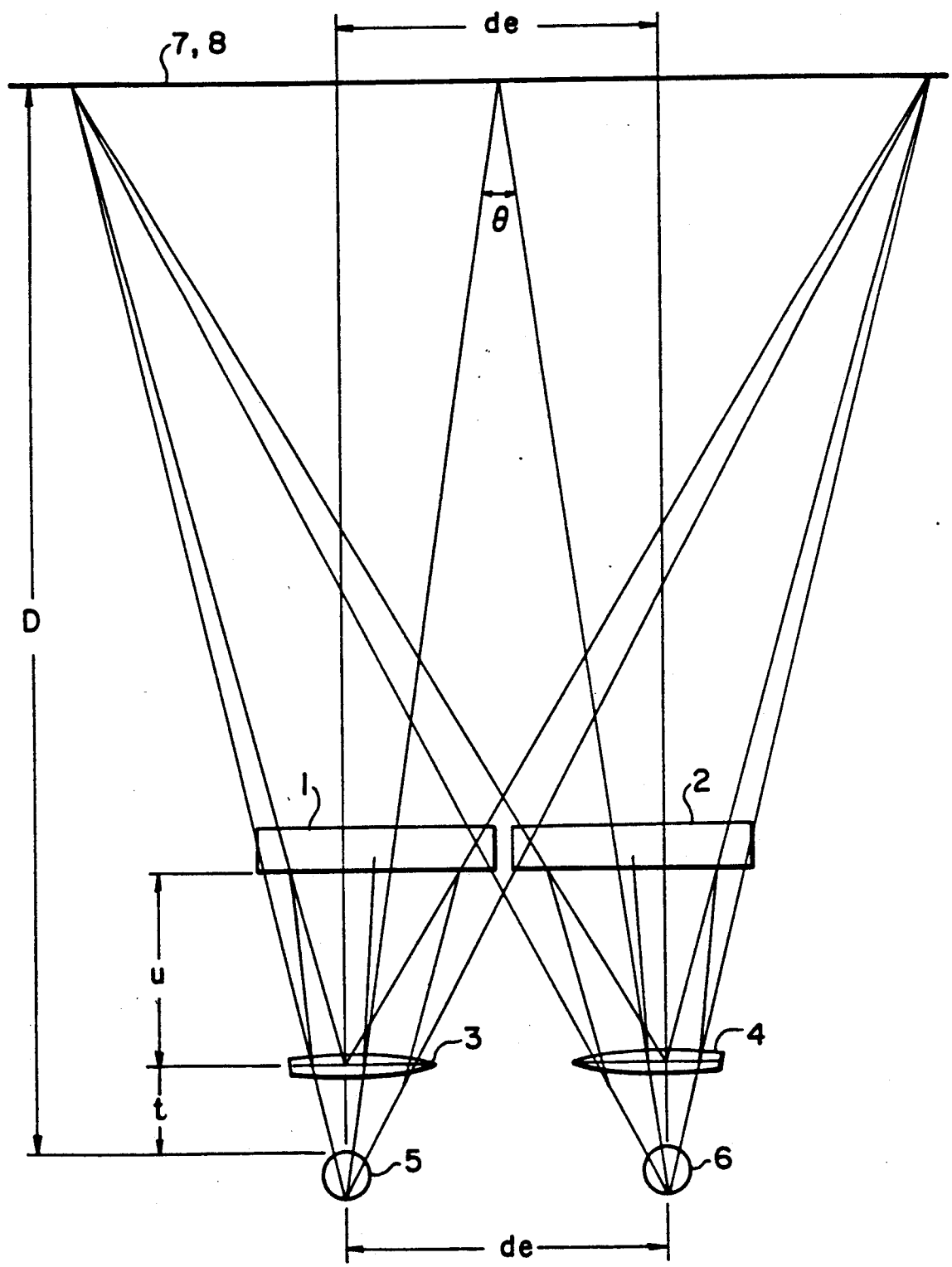
FIG. 1 is a schematic diagram showing the principle of a video display apparatus in accordance with the present invention.

FIG. 1 schematically shows the principle of a video display apparatus in accordance with the present invention.

It is assumed here that two liquid crystal displays 1 and 2 display images on the basis of the same video signals.

First, a right magnifying lens 4 is positioned between a right eye 6 and the liquid crystal display 2 for the right eye so that the distance between the liquid crystal display and the magnifying lens is u while the distance between the magnifying lens and the right eye is t. A virtual image 8 enlarged by the magnifying lens is formed on the screen of the liquid crystal display at distance D from the right eye.

Similarly, a left magnifying lens 3 is positioned between a left eye 5 and the liquid crystal display 1 for the left eye so that the distance between the liquid crystal display and the magnifying lens is u while the distance between the magnifying lens and the left eye is t. A virtual image 7 expanded by the magnifying lens is formed on the screen of the liquid crystal display at a distance D from the left eye.

If the focal lengths of the left and right magnifying lenses is f, the following relationship is established between D, u, t and f from a lens formula:

$$1/f = -1/(D-t) + 1/u \qquad (1).$$

If the multiplication factor of the magnifying lens is m, $$m = (D-t)/u \qquad (2)$$

The left and right eyes are distanced from each other by a distance de (ordinarily, 58 to 72 mm, 65 mm on average, or 62 mm on average in the case of Japanese). It is known that the distance between the two eyes is an important factor of a process of obtaining information on the object.

If a person views an object located at the distance D from the eyes, he focuses the eyes to the distance D while effecting convergence by directing the optical axes of the eyes to the object. As focusing and convergence are effected in a linked relationship, a process of fusing images obtained through the two eyes is performed by the cerebrum without imposing any burden on the eyes.

Figure 2A:
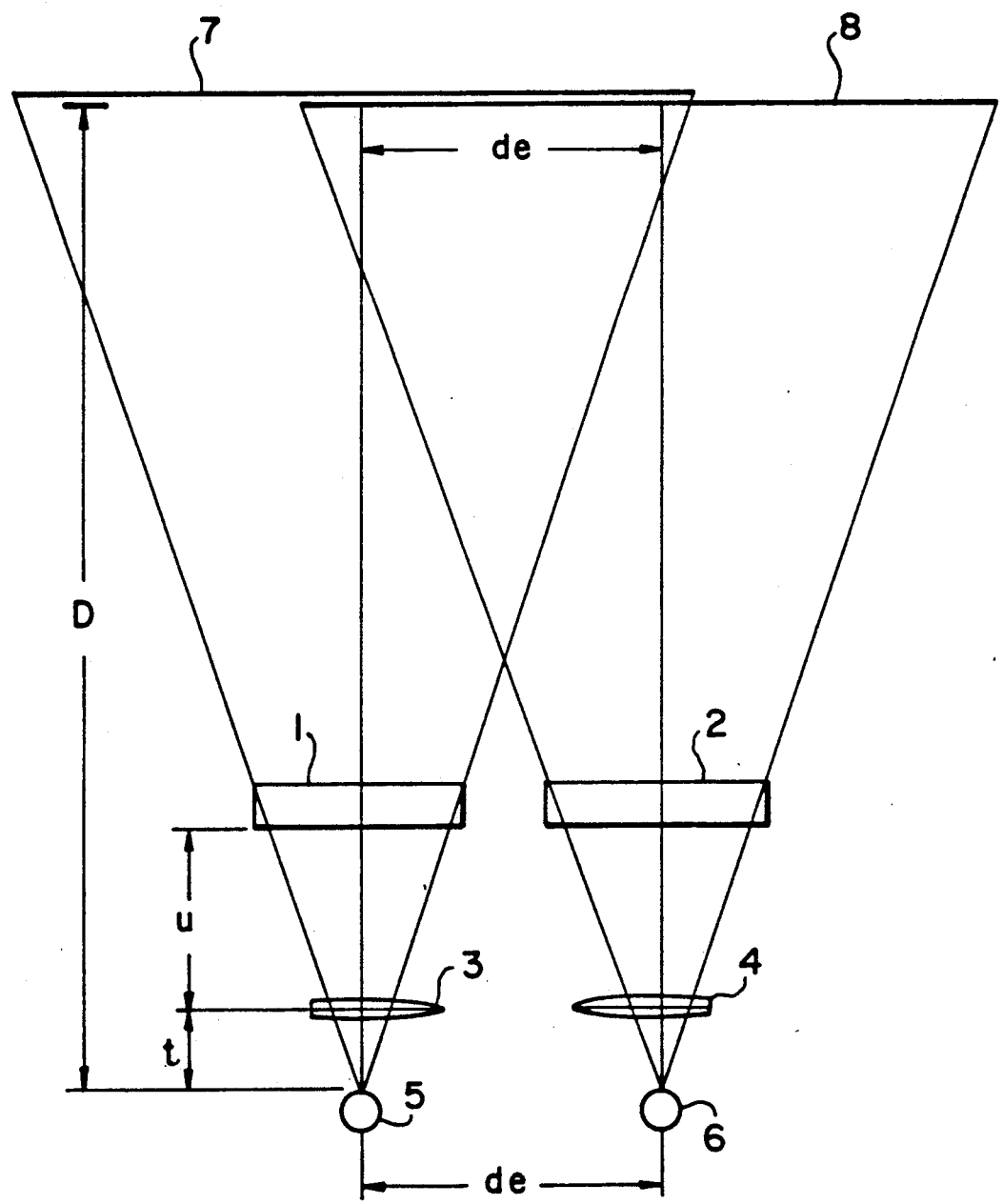
FIGS. 2(a) and 2(b) are schematic diagrams of examples of cases where images fusion is difficult to perform.

In a case where the centers of the frames on the liquid crystal displays are adjusted to the optical axes of the lenses as shown in FIG. 2(a), the convergence angle is 0°, that is, the eyes are converged to an infinite distance while the eyes are focused to the distance D, and there is an extremely high degree of nonconformity therebetween, resulting in unnatural perception.

Figure 2B:
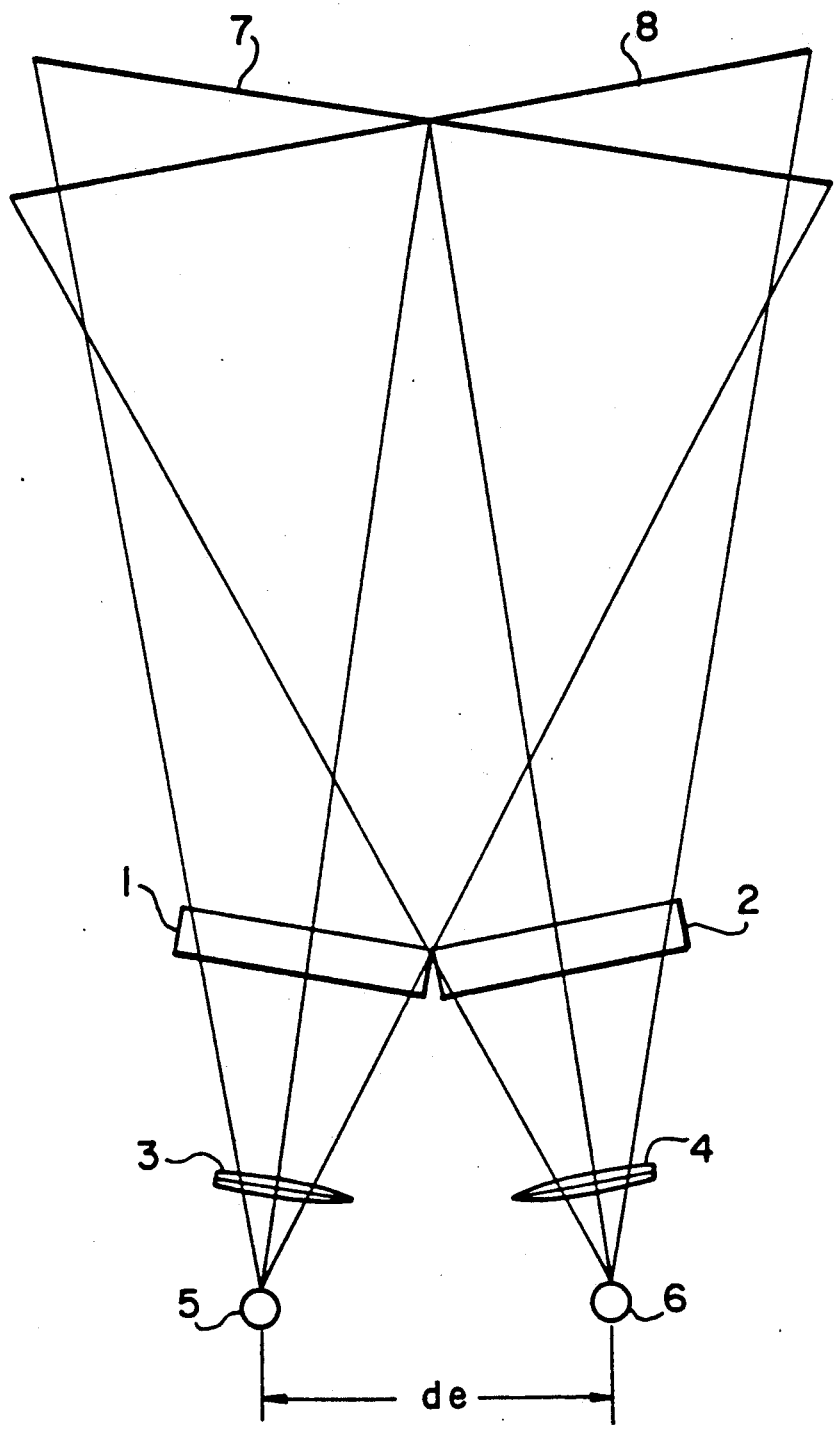

In a case where the optical axes of the lenses are converged as shown in FIG. 2(b), both focusing and adjustment of the convergence angle match the distance D, but the left and right images do not coincide with each other. If the frame size is large or if D is small, image fusion in the cerebrum is difficult, resulting in perception of a doubled image or visual field struggle. Even if image is effected suitably, certain burdens are imposed on the eyes.

Then, a case where, as shown in FIG. 1, an imaging surface on which the enlarged left and right virtual images coincide with each other will be examined below. In this case, the optical axes of the left and right lenses are spaced apart from each other by de at the imaging surface also. Conversely, to establish this state, it is sufficient to adjust the axes of the lenses to points distanced from the centers of the frames on the liquid crystal displays outward in the horizontal direction by $$de/2m = de \cdot u/2(D-t)$$

The left and right liquid crystal displays and the left and right magnifying lenses are disposed so as to satisfy this condition, thereby enabling the viewer to see as if a large screen is placed at the position D from the eyes. For instance, when the centers of the frames on the liquid crystal displays are viewed, the left and right eyes are focused to the centers of the enlarged virtual images formed at the distance D from the eyes and are converged with an convergence angle of $\theta$. In this state, focusing and convergence of the two eyes are smoothly effected in a linked relationship, and image fusion is effected in the cerebrum without imposing any burden on the eyes.

Figure 3A:
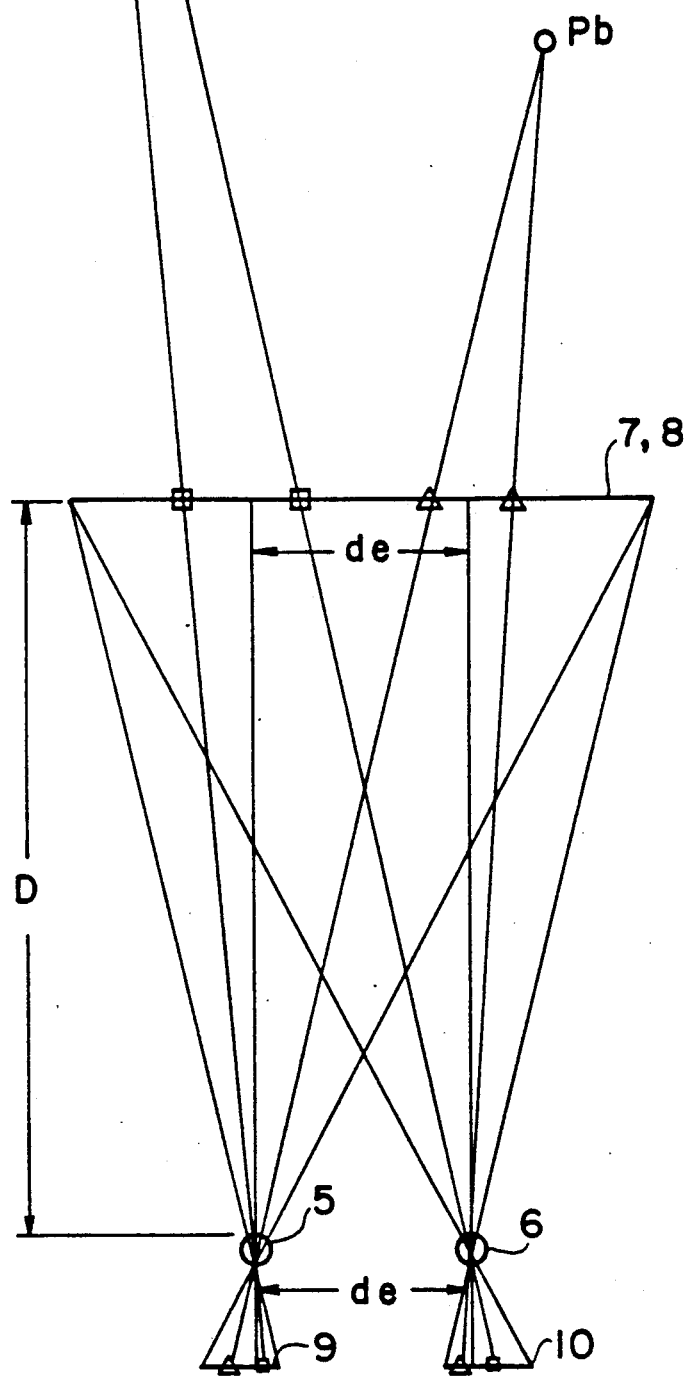
FIGS. 3(a) and 3(b) are diagrams of the principle of three-dimensional imaging.
Figure 3B:
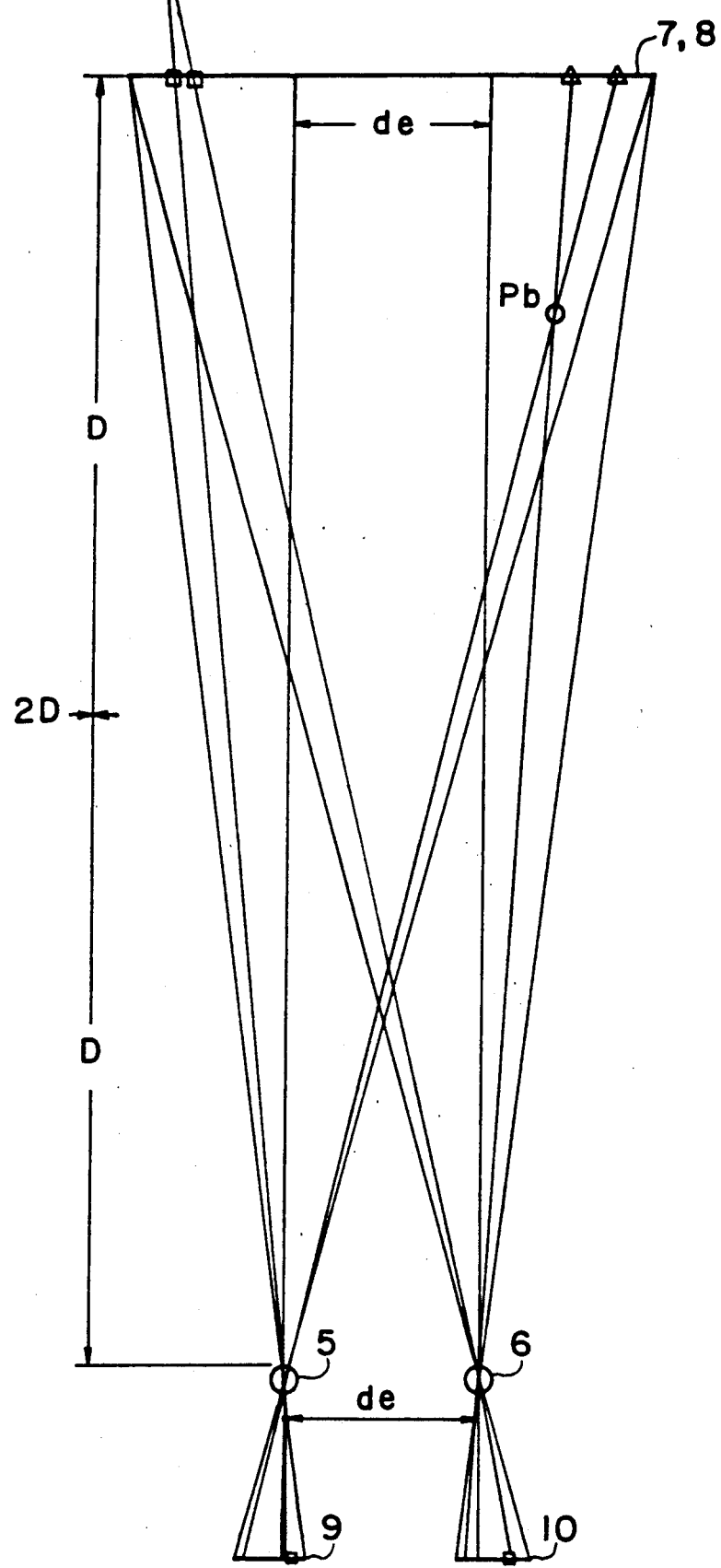

Then, a case where two video signals obtained by imaging in the manners shown in FIGS. 3(a) and 3(b) are used to display on the left and right liquid crystal displays of the video display apparatus based on the system illustrated in FIG. 1.

Objects Pa and Pb are provided, as shown in FIGS. 3(a) and 3(b). It is assumed here that there is a plane located at a distance D from the eyes as shown in FIG. 3(a), and that an image 7 is projected on this plane with respect to a reference point corresponding to the left eye. Similarly, an image 8 is formed on the plane with respect to a reference point corresponding to the right eye. Two convex lenses are provided in place of the eyes, and the images 7 and 8 are converted into video signals as a result of imaging on image pickup devices 9 and 10.

These video signals are used to display left and right images in corresponding positions on the video display apparatus based on the system illustrated in FIG. 1. As a result, the objects Pa and Pb are displayed three-dimensionally as if they are actually located at the viewed positions.

This is based on the principle of binocular parallax. The images of the objects are seen three-dimensionally due to the difference between the convergence angles at which the objects Pa and Pb are viewed.

In a case where two left and right images projected on a plane located at a distance 2D from the eyes are viewed through the video display apparatus, the overall positional relationship is seen on a ½ scale. Thus, zooming of three-dimensional images can be effected.

Thus, the video display apparatus in accordance with the present invention enables the viewer to see images on a large scale through the liquid crystal displays having small screens without experiencing fatigue of his eyes. Also, the apparatus enables stereoscopic vision.

Figure 4A:
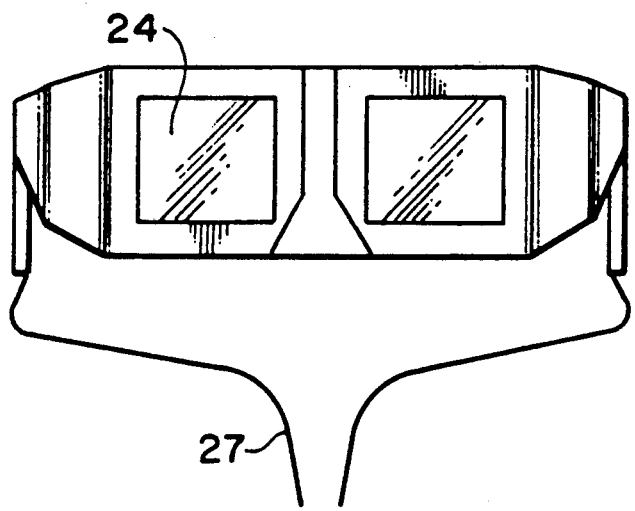
FIGS. 4(a) to 4(c) are a front view, a side view and a plan view of a video display apparatus which represents an embodiment of the present invention.
Figure 4B:
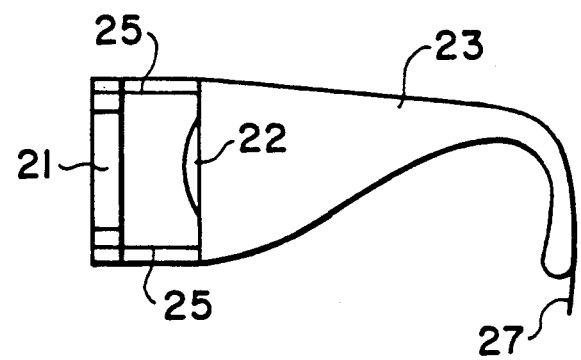
Figure 4C:
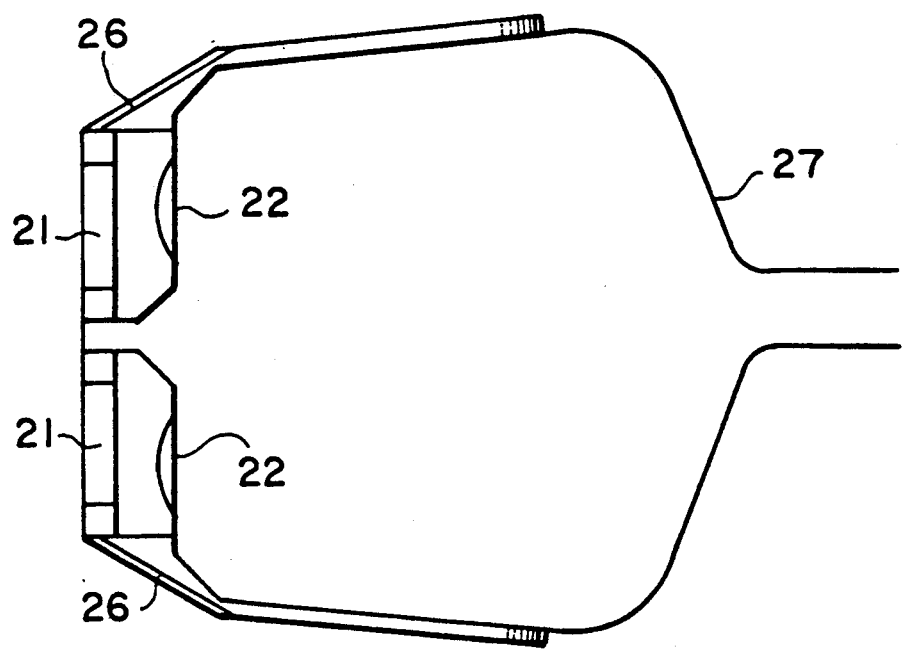

FIGS. 4(a) to 4(c) are a front view, a side view and a plan view, respectively, of a first embodiment of a video display apparatus of the present invention.

A pair of liquid crystal displays 21 and a pair of magnifying lenses 22 are disposed in optical positions as indicated in FIG. 1 and are mounted on a main frame 23. A pair of white acrylic plates 24 are provided at the rear of the liquid crystal displays in order to enable the viewer to see the liquid crystal display with natural light. External light is introduced into the apparatus through these acrylic plates.

Driving circuit boards 25 for driving the liquid crystals are mounted on upper and lower side portions of the main frame 23, and signal processing circuit boards 26 are mounted on left and right side portions of the main frame 23.

Figure 5:
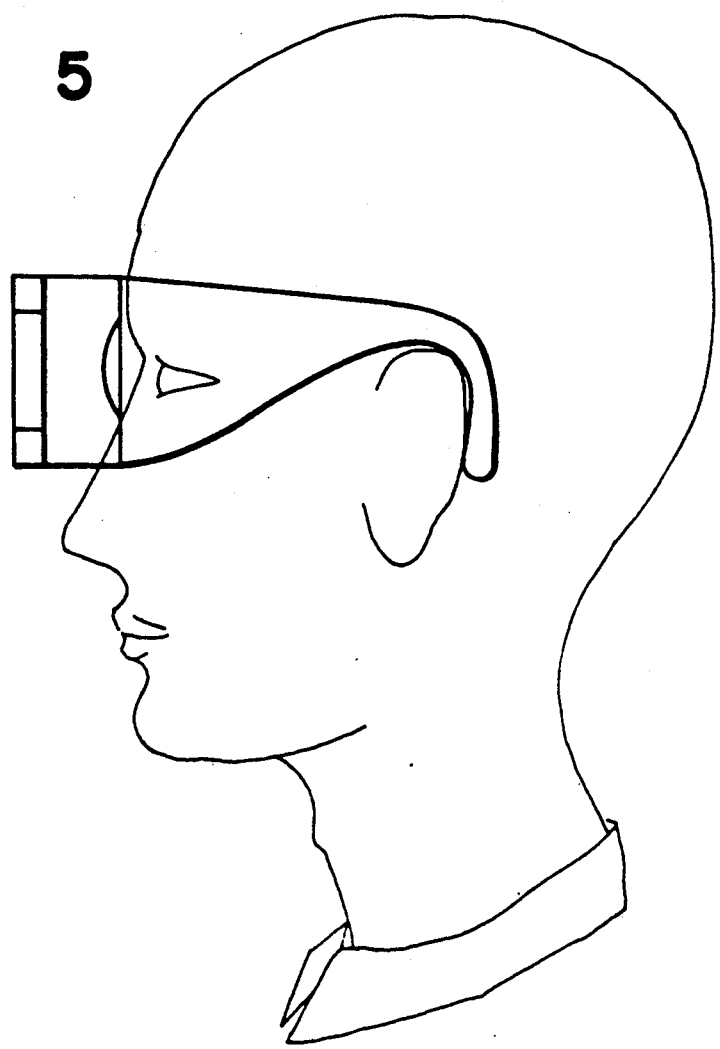
FIG. 5 is a diagram showing the apparatus shown in FIGS. 4(a) to 4(c) being used by a viewer.

Connection cables 27 are provided. In this embodiment, two video signal lines, a power supply line and a ground line are connected as the connection cables 27 to an external power adaptor (not shown) and to an external video apparatus (not shown). FIG. 5 shows a state in which the viewer has the video display apparatus on.

The above-described embodiment apparatus can serve to achieve the object of the present invention. However, there is still room for improvements, as described below.

① Since the liquid crystal display uses external light, images on the display cannot be seen in the nighttime or in a dark place.

② The total weight of the liquid displays, the magnifying lenses and the circuit boards is received by the nose, and the degree of burden on the nose is therefore high.

③ The viewer cannot see outside the display while wearing the display apparatus; he must take it off if he wishes to see the outside.

The first problem can be solved by attaching a backlight to the above-described apparatus. However, the second problem may become more serious by the addition of the weight of this backlight.

Figure 6A:
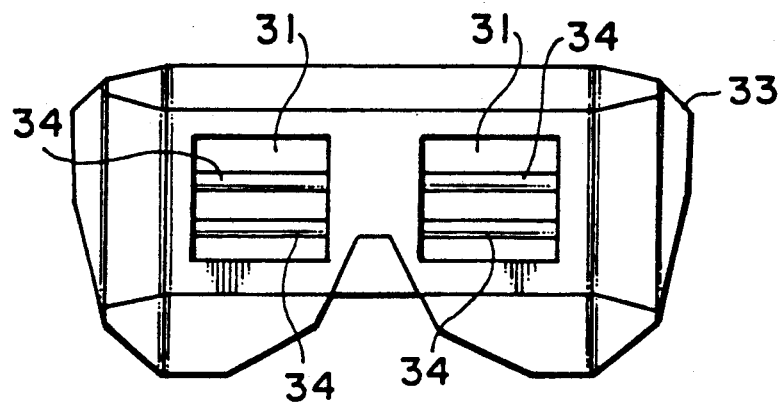
FIG. 6(a) is a front view of a video display apparatus which represents another embodiment of the present invention.
Figure 6B:
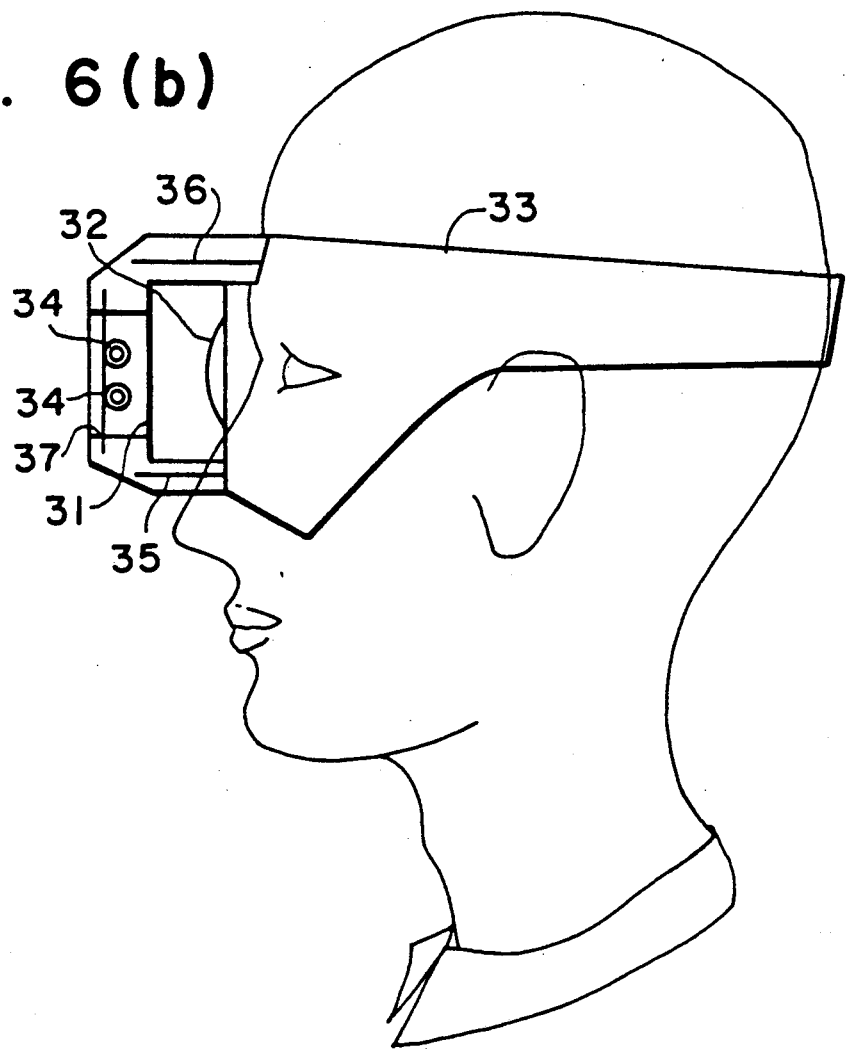
FIG. 6(b) is a side view of the video display apparatus shown in FIG. 6(a)

To cope with this problem, the apparatus may have the form of ski goggles instead of the illustrated form similar to spectacles. FIG. 6(a) shows a front view of an example of the apparatus in accordance with the present invention, and FIG. 6(b) shows a side view of the same when in use. This apparatus is worn so that its weight is distributed to the forehead, portions in the vicinity of the forehead, cheeks and so on, thereby solving the first and second problems.

This goggle-like form is disadvantageous in terms of the third problem because it makes it more difficult to take off the display apparatus. Moreover, the backlight is disposed on a prolongation of each optical axis, and the dimension between the eyes and the front end of the main frame is thereby increased, which result is considerable in terms of safety.

The above-described apparatus entails a problem relating to this in that the size of each liquid display is restricted because the optical axes of the lenses are located on parallel straight lines.

It is possible to solve these problems by adopting a half mirror, as described below.

Figure 7A:
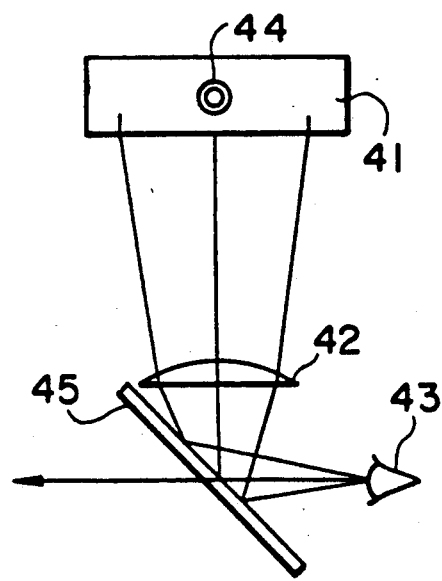
FIGS. 7(a) and 7(b) are diagrams of the principles of optical system which enables the viewer to see the outside.
Figure 7B:
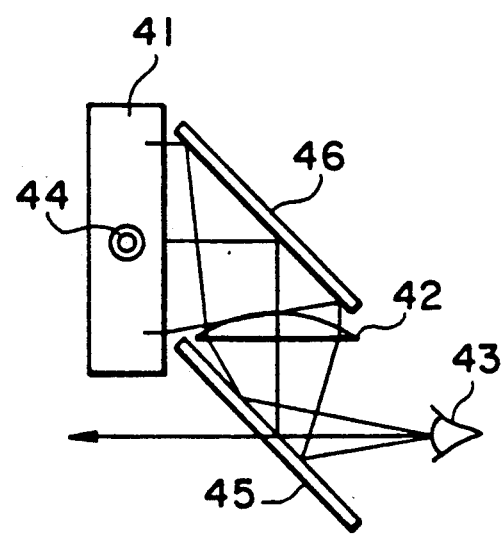

FIGS. 7(a) and 7(b) are schematic diagrams of basic optical systems. In the example illustrated in FIG. 7(a), a half mirror 45 is disposed between an eye 43 and a magnifying lens 42 with a liquid display 41 and the magnifying lens 42 being disposed on the reflection side of the half mirror 45, while these components are maintained in the same optical positions as those shown in FIG. 1. The structure including the space between the liquid display 41 and the half mirror 45 is designed to prevent any external light from entering this space. The outside scenery can be viewed from the eye 43 during the time when reflection on the half mirror 45 is eliminated by turning off a backlight 44.

During the time when the backlight 44 is turned on, the amount of reflection light from the half mirror is larger than the amount of external light transmitted from the outside through the half mirror 45, thereby enabling the screen of the display 41 to be seen from the eye 43. However, when the outside is extremely bright, images from the outside and the image on the screen are seen in a superposed state. To cope with this problem, a shutter may be disposed on a prolongation of the line of transmission through the half mirror, that is, between the half mirror 45 and the outside. This shutter is closed to shut off any external light during viewing on the screen of the display 41.

In the example illustrated in FIG. 7(a), the light from the screen is reflected on the half mirror 45 only one time, and the image perceived with the eye corresponds to an image obtained by inverting the image displayed on the screen of the liquid crystal display 41. For this reason, it is necessary to adopt special means in order to enable normal viewing, e.g., reversing the direction of the liquid crystal plate of the liquid crystal display or inverting the left and right by specific signal processing.

FIG. 7(b) shows another example of the optical system in accordance with a further different embodiment of the present invention which is designed to use another mirror 46 in order to eliminate the above-described problems.

Figure 8A:
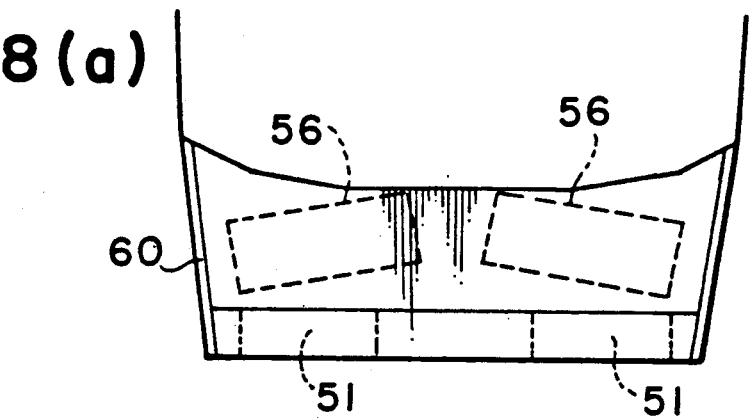
FIGS. 8(a) to 8(c) are a plan view, a front view and a side view, respectively, of a further embodiment of a video display apparatus according to the present invention which enables viewing of the outside.
Figure 8B:
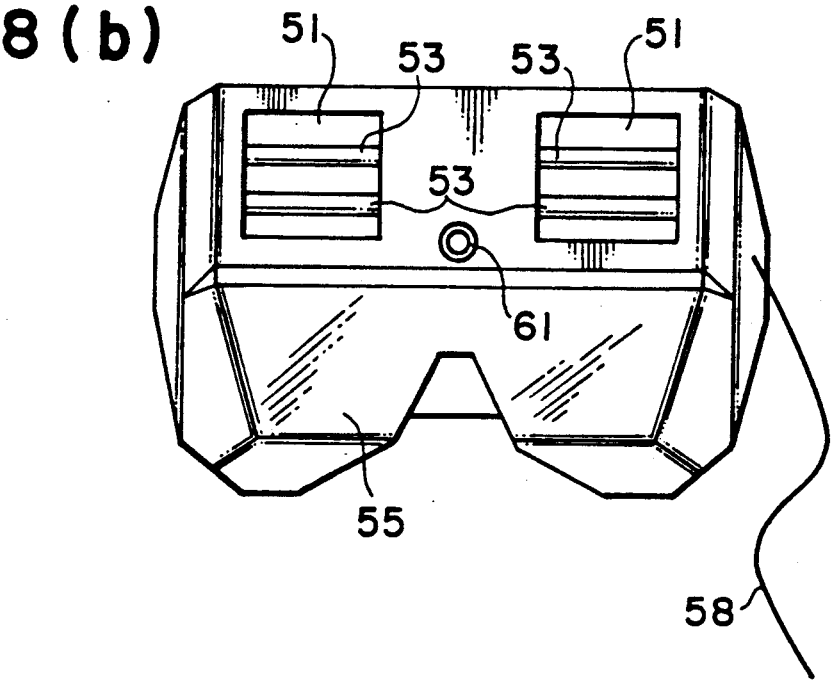
Figure 8C:
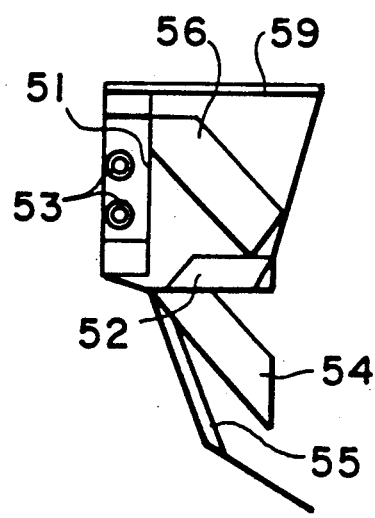
Figure 9:
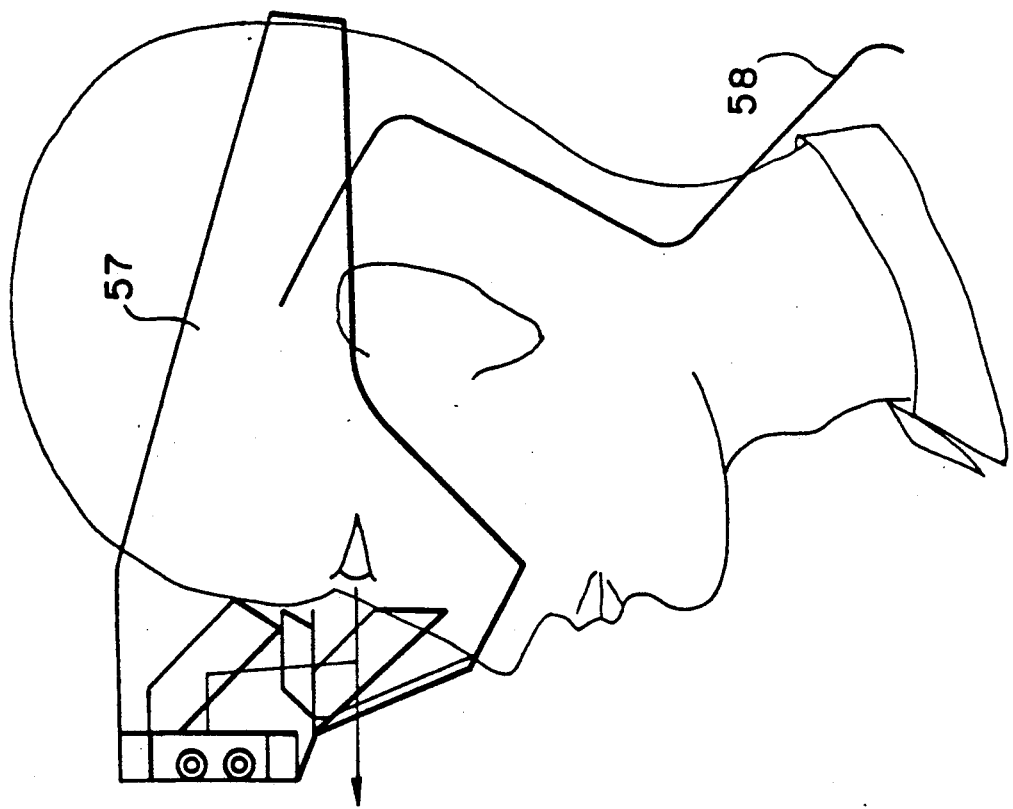
FIG. 9 is a side view of the embodiment shown in FIG. 8(a) to 8(c)

A video display apparatus in accordance with this embodiment of FIG. 7(b) will be described below. FIGS. 8(a) and 8(b) are a plan view and a front view of this embodiment, respectively; FIG. 9 is a schematic diagram of a state in which the embodiment apparatus is put on; and FIG. 10 is a perspective view of main component parts of this embodiment.

Figure 10:
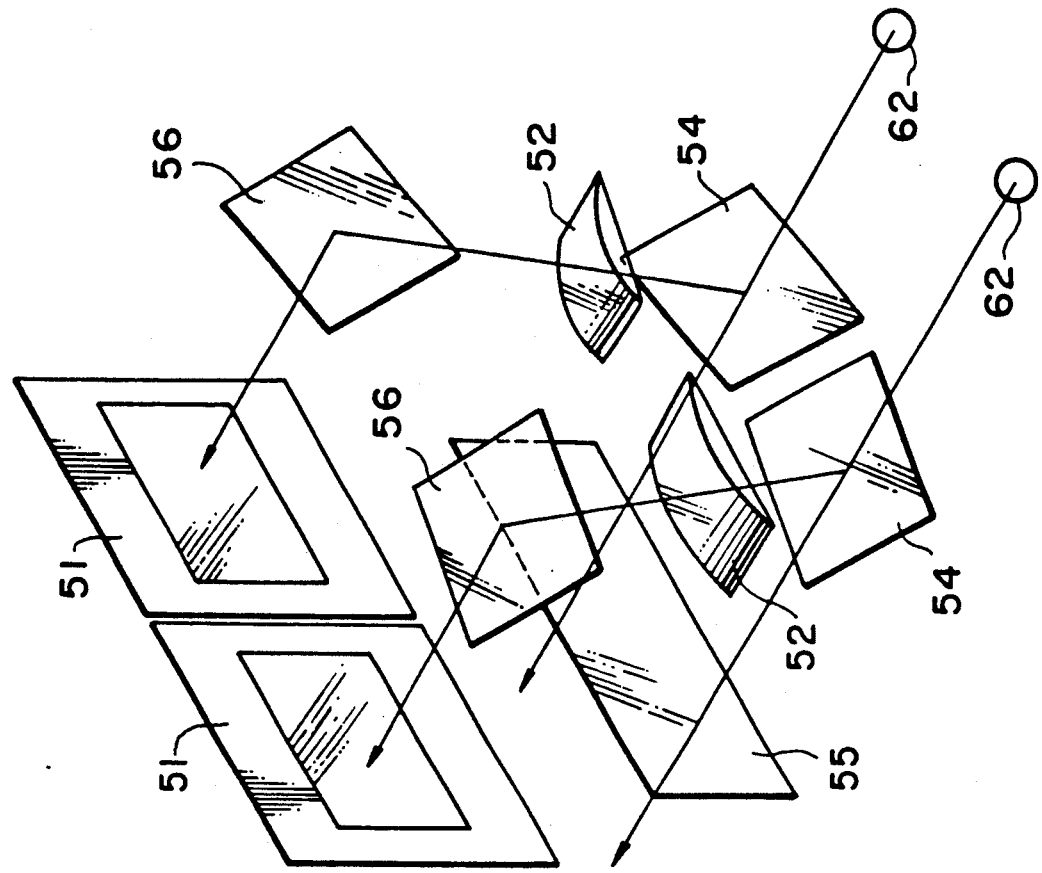
FIG. 10 is a perspective exploded view of the arrangement of main components parts of a still further embodiment of a video display apparatus of the present invention which enables viewing of outside scenery.

As illustrated in FIG. 10, the optical positions of the components are essentially the same as those shown in FIG. 1 and in FIG. 7(b).

In this embodiment, however, half mirrors 54 or 56 are turned outwardly while maintaining the parallelism with the other half mirrors 56 or 54 so that the distance between the optical axes at the liquid crystal displays 51 becomes larger than the distance between the eyes.

In this embodiment, a liquid crystal shutter 55 is used as the shutter. A lock type switch 61 which is turned on or off each time it is depressed is provided to control a backlight 53 and the liquid crystal shutter 55.

During the off state of the power supply, the liquid crystal shutter 55 is transparent and therefore allows the outside scenery to be seen from the eyes.

During the on state of the power source, the liquid crystal shutter 55 is closed, and the backlight of each liquid crystal display 51 is lighted up, thereby enabling the screens of the liquid crystal displays 51 to be seen from the eyes.

If the switch 61 is depressed, the backlight is extinguished and the liquid crystal shutter 55 becomes transparent, thereby enabling viewing of the outside. If the switch 61 is depressed again, the power on state is restored and the screens of the liquid crystal displays 51 become visible.

This embodiment enables the total weight of the display apparatus to be supported mainly on the whole of the forehead, as shown in FIG. 9, thereby avoiding localization of the load. In addition, the front extreme end is not located on the prolongation of the eye optical path, thereby enabling the viewer to see the outside immediately when he wishes to do so. This function is preferable in terms of safety.

In the above-described embodiments, the liquid crystals are employed. However, in accordance with the present invention, it is possible to use CRTs, plasma displays or other types of flat displays in place of the liquid displays.

It is also possible to use three layers of liquid displays for each of the left and right display for the purpose of overcoming the problem of difficulty in increasing the number of picture elements of the liquid crystal display.

Figure 11:
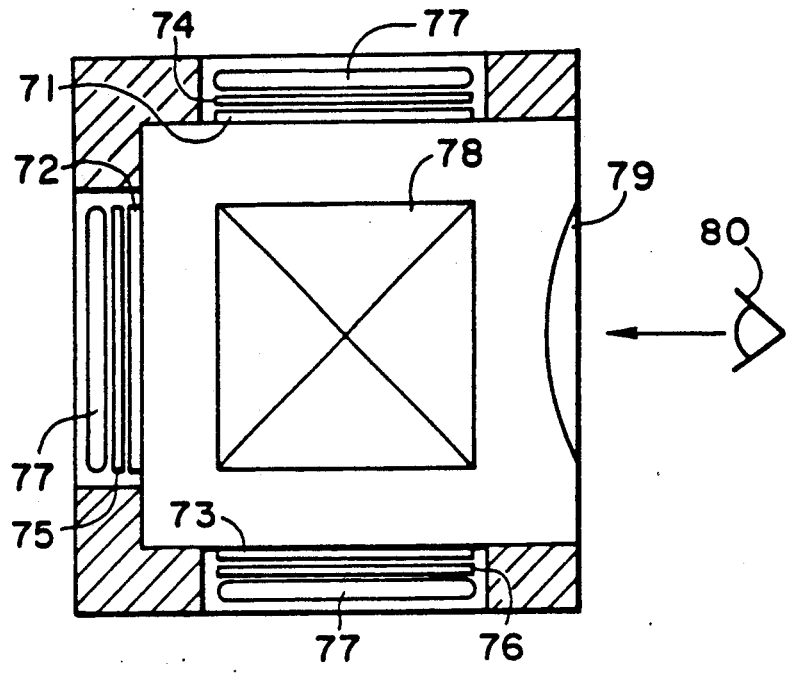
FIG. 11 is a cross-sectional view of a still further embodiment of the present invention in which three layers of liquid crystal displays are used for each of the left and right displays to improve the resolution, illustrating the principle thereof.

FIG. 11 shows in section a still further embodiment of the present invention having three layers of liquid crystal displays. Electroluminescent elements 77 are used as backlights. Images corresponding to red (R), green (G) and blue (B) signals are displayed on three liquid crystal displays 71 to 73. Color filters 74 to 76 corresponding to red, green and blue are provided.

Unnecessary components of light emitted from the backlights are cut off by the color filters 74 to 76. The lights transmitted through the color filters, i.e., R, G and B lights are introduced into the corresponding liquid crystal plates.

Images thereby displayed independently are superposed by a dichroic prism 78 and are viewed through a magnifying lens 79 as a displayed color image.

This arrangement enables an improvement in resolution because, if liquid crystal displays each having a hundred thousand picture elements are used, the resulting image can be displayed with three hundred thousand picture elements.

Figure 12:
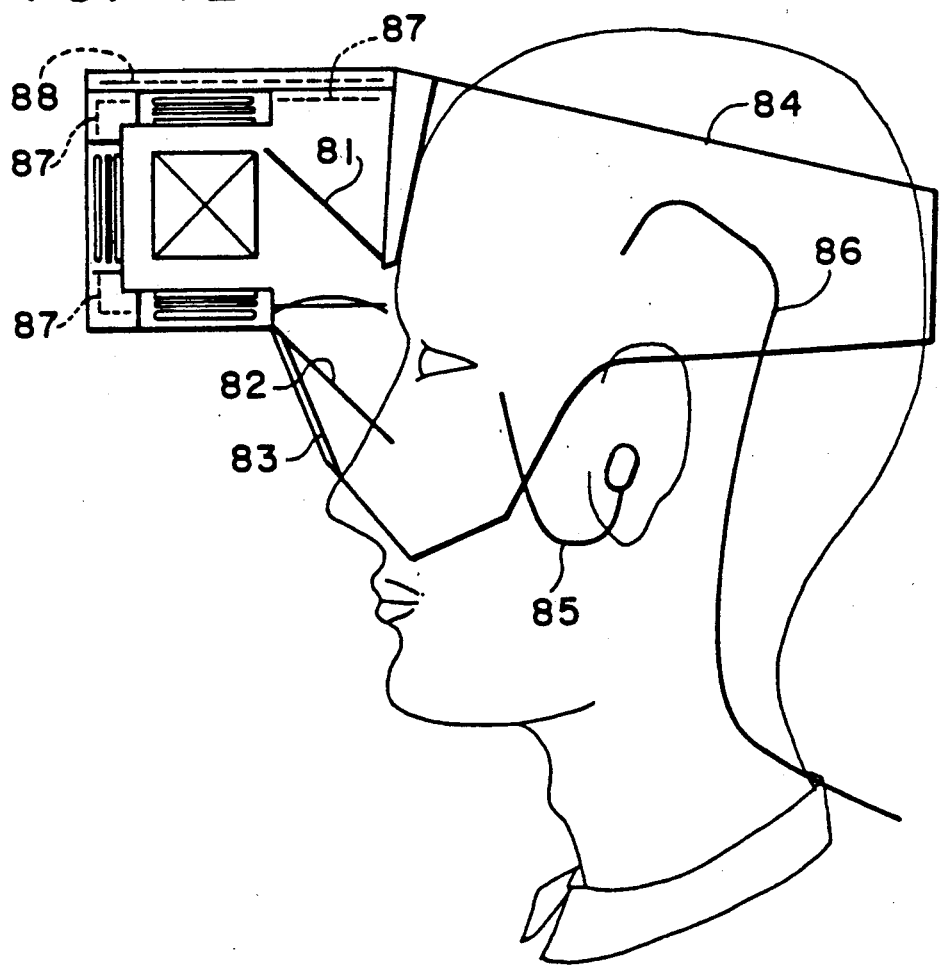
FIG. 12 is a side view of the embodiment shown in FIG. 11.

FIG. 12 shows a schematic illustration of a used state of an example of application of this principle. In this example, a headset 85 is also provided integrally with the video display apparatus.

What is claimed is:

1. A video display apparatus comprising:
   left and right display means for displaying images to be respectively viewed with left and right eyes by using television signals;
   left and right magnifying lenses interposed between the left and right eyes and said left and right display means respectively; and
   a frame supporting said display means and said magnifying lenses, left and right virtual images being formed at a virtual image distance from the left and right eyes by said magnifying lens and coinciding with each other, said virtual image distance being greater than the distance between said lenses and said display means, and when the left and right eyes are directed to the respective virtual images, the eyes are converged at a convergence angle corresponding to an angle determined by said virtual image distance.

2. A video display apparatus according to claim 1, wherein said display means includes a liquid crystal display.

3. A video display apparatus according to claim 1, wherein stereoscopic vision is enabled by displaying on said left and right image display means by using left and right video signals prepared on the basis of the principle of three-dimensional display relating to binocular parallax.

4. A video display apparatus comprising: left and right display means for display images to be respectively viewed with left and right eyes by using television signals;
   left and right magnifying lenses interposed between the left and right eyes and said left and right display means respectively; and
   a frame supporting said display means and said magnifying lenses, left and right virtual images being formed by said magnifying lens at a virtual image distance greater than the distance between said lenses and said display means and when images on said left and right display means are viewed with said left and right eyes, said virtual images coinciding with each other; and at least one half mirror disposed between said magnifying lenses and the eyes, wherein said magnifying lenses and said display means are disposed on the reflection sides of said at least one half mirror, and the amount of light transmitted through said display means is controlled so that images displayed on said display means and the outside scenery transmitted through said at least one half mirror selectively can be viewed by said right and left eyes of a viewer, said images being selected if the amount of light transmitted from said display means is higher than the outside light being transmitted through said at least one half mirror, and said images and outside scenery being simultaneously superposed on each other if the outside light is brighter than that of the light transmitted from the display means.

5. A video display apparatus according to claim 4, further comprising a shutter disposed between said half mirror and the outside scenery in the direction of transmission through said half mirror, wherein, even if the brightness on the outside is high as compared with the amount of light emitted from said display means, images displayed on the display screens can be viewed alone by closing said shutter to shut off light transmitted through said half mirror.

6. A video display device for viewing electronic images of external images, comprising:
   a frame adapted to be worn on a user's head;
   a pair of display means, mounted in said frame, for receiving video signals and displaying electronic images on respective right and left mounted display means, said right and left display means being associated with the respective right and left eyes of the user;
   a right magnifying lens disposed in front of the right eye of the user; and
   a left magnifying lens disposed in front of the left eye of the user, said magnifying lenses being supported in said frame to form left and right enlarged virtual images of the images displayed on said display means at a virtual image distance greater than the distance between said lenses and display means when the left and right eyes of a user view the images on the display means, said virtual images coinciding with each other.

7. A video display apparatus according to claim 6, further comprising at least one-half mirror disposed between each said magnifying lens and the associated eye of the user, each said at least one-half mirror being arranged to reflect light transmitted from said display means and to transmit outside light defining the external images; and means for controlling the amount of light transmitted from said display means, wherein said magnifying lenses and said display means are disposed on the reflection sides of said at least one-half mirrors and the outside light is disposed on the non-reflection sides of the half mirror so that said means for controlling the amount of light from said display means determines the selection of at least one of the group comprising the electronic images being viewed by a user and the external images.

8. A video display apparatus according to claim 7 further comprising a shutter disposed between said at least one-half mirrors and the outside light in the direction of light transmission through said at least one-half mirrors, wherein, even if the amount of outside light is higher than the amount of light emitted from said display means, images displayed on the display screens can be viewed alone by closing said shutter to shut-off the outside light transmitted through said at least one-half mirrors.

* * * * *